United States Patent Office 2,958,673
Patented Nov. 1, 1960

2,958,673

GRAFT POLYMER AND METHOD OF MAKING

Yun Jen, Stamford, Conn., assignor to American Cyanamid Company, New York, N.Y., a corporation of Maine No Drawing. Filed July 18, 1957, Ser. No. 672,572

3 Claims. (Cl. 260—45.5)

This invention relates to the production of a new and useful class of graft polymers, and includes both composition and method features. Unlike ordinary copolymers in which the different monomer units are randomly distributed, graft polymers (sometimes designated as "graft copolymers") have a more orderly arrangement of the different monomer units.

Graft polymers of various kinds are old in the art and are disclosed in numerous patents, for instance, U.S. Patents 2,649,434; 2,649,435; 2,657,191; 2,666,025; 2,666,042; 2,719,136; 2,732,363; 2,734,040; 2,735,830; 2,735,831; and 2,754,282; also, in British Patents 715,194; 733,093; and 749,494. However, to the best of my knowledge and belief it was not known prior to my invention to prepare a graft polymer as hereinafter more fully described and which involves the use of particular unsaturated reactants employed in a particular and critical way, and a particular and critical range of proportions of said reactants.

In making the graft polymers of this invention, I prepare a thermoplastic copolymer by polymerizing, with the aid of a polymerization catalyst, a polymerizable mixture of monomers consisting of (a) a compound containing a single $CH_2=C<$ grouping and (b) a compound which is copolymerizable with the compound of (a) and which contains two double bonds at least one of which is unconjugated. The compound of (b) constitutes from 0.5 mole percent to not more than about 30 mole percent of the total molar amount of (a) and (b) in the aforesaid polymerizable mixture. To the resulting, reactive, thermoplastic copolymer, there is then grafted, by copolymerization with the aid of a polymerization catalyst, a third compound (c) which is polymerizably reactive with the aforesaid copolymer. This third compound is one which is different from the compound of (a) and contains a single $CH_2=C<$ grouping. The molar proportions of the compound of (c) to the total of the compound of (a) plus (b) are from about 50:99.5 of the compound of (c) to 0.5:50 of the total of the compounds of (a) plus (b).

Advantageously the compound of (a), supra, is a monovinyl compound, that is, a compound containing a single $CH_2=CH-$ grouping, for instance an alkyl (including cycloalkyl) acrylate, e.g., methyl to octadecyl acrylate, inclusive, cyclohexyl acrylate, etc., aralkyl acrylate, e.g., benzyl acrylate, etc., aryl acrylate, e.g., phenyl acrylate, etc., and alkaryl acrylate, e.g., tolyl acrylate, etc., as well as higher members of the homologous series. The compound of (a) also may be an ester of an alpha-substituted acrylic acid, e.g., methacrylic acid, ethacrylic acid, propacrylic acid, isopropacrylic acid, butacrylic acid, phenacrylic acid and the higher homologues thereof, more particularly the alkyl (including cycloalkyl), aralkyl, aryl and alkaryl esters of such acids and wherein the ester grouping corresponds, for instance, to those groupings just named by way of example with respect to the esters of acrylic acid. Instead of the esters just named, the compound of (a) can be the acid itself corresponding to the particular ester.

Illustrative examples of the compound of (b), supra, are vinyl acrylate and methacrylate, allyl acrylate and methacrylate, diallyldialkyl ammonium salts, e.g., diallyldimethyl ammonium chloride, etc., diallyl aminotriazines, e.g., diallyl melamine, etc., diallyl esters of aromatic polycarboxylic acids, e.g., diallyl phthalate, etc., diallyl esters of saturated aliphatic polycarboxylic acids, e.g., diallyl malonate, diallyl succinate, diallyl adipate, etc.

Illustrative examples of the compound of (c), supra, are acrylonitrile, methacrylonitrile, the various nuclearly substituted alkylstyrenes, e.g., the various isomeric forms of the nuclearly substituted monomethylstyrenes, dimethylstyrenes, monoethylstyrenes, diethylstyrenes, etc., and compounds which are different from the compound of (a) but are selected from the same class as (a), numerous specific examples of which have been given hereinbefore.

The general scheme of preparing graft polymers of this invention is to first form a copolymer containing a pendant double bond from the reactants of (a) and (b) in the particular proportions given hereinbefore. The double bond is activated in the second-stage polymerization whereby a third monomer is grafted onto the aforesaid copolymer of (a) and (b). It is important, therefore, that the double bond from monomer (b) that becomes the pendant double bond in the copolymer of (a) and (b) should not be as reactive as the other double bond in monomer (b) in order to avoid a cross-linking reaction.

The copolymer of (a) and (b) is prepared by any of the methods commonly employed in vinyl-type polymerization reactions, and the polymerization is preferably carried out with the aid of a polymerization catalyst in order to shorten the time of reaction. Examples of suitable catalysts are the various peroxide catalysts, e.g., benzoyl peroxide, etc.; the various azo catalysts, e.g., alpha,alpha'-azodiisobutyronitrile, etc.; the various reduction-oxidation ("redox") catalyst systems, e.g., a combination of ammonium persulfate and sodium meta-bisulfite; and the like. Additional examples of catalysts that can be used are given in, for instance, Price U.S. Patent No. 2,723,258, column 3, line 33, through line 7 in column 4. So-called "free-radical" types of catalyst are preferred and by the use of which so-called "free-radical-initiated" copolymers are obtained.

If desired, the mixture of monomers (a) and (b) can be polymerized in emulsion or in solution state to yield the thermoplastic, reactive copolymer. Good results are obtained by effecting copolymerization while the monomers are dissolved in a suitable solvent, advantageously water or a liquid solvent comprising mainly water when the chosen monomeric mixture is soluble in such a solvent. Suitable organic solvents also can be used if desired, e.g., benzene, toluene, xylene, etc., when the chosen monomeric mixture is soluble in an organic solvent. Preferably, the copolymerization reaction between monomers (a) and (b) is carried out in a liquid medium. Sometimes it may be advantageous to carry out the copolymerization in the presence of a chain-transferring agent such as butyl mercaptan.

The copolymerization of monomers (a) and (b) also can be effected by conventional bulk polymerization technique, in the presence or absence of a solvent capable of dissolving the monomeric mixture; or by conventional bead polymerization methods. The polymerization of the mixture of monomers can be effected by a continuous or a semi-continuous process, as well as by a batch operation.

The concentration of the catalyst is relatively small, e.g., from, by weight, about 1 part of catalyst per 1000 parts of the monomeric mixture to about 3 or 4 parts of catalyst per 100 parts of the mixture of monomers.

The temperature of copolymerization of monomers (a) and (b) in the proportions specified in the third paragraph of this specification can be varied over a wide range up to and including or slightly above the boiling point (at atmospheric pressure) of the monomeric mixture. In most cases, the polymerization temperature will be within the range of about 20° or 30° C., preferably at least 35° or 40° C., up to the boiling temperature of the mixture of monomers, depending, for example, upon the particular catalyst used, the rapidity of polymerization wanted, the nature of the solvent (if used), and other influencing factors. The use of polymerization temperatures substantially above the boiling point of the mixture of monomers is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

The copolymer of monomers (a) and (b) is preferably (although not necessarily) isolated from the reaction mass before monomer (c) is grafted thereto. Thus, if the copolymerization reaction between monomers (a) and (b) is carried out while the mixed monomers are dissolved or dispersed in a liquid medium, e.g., in solution in water and in which the copolymer is insoluble, the copolymer then is separated from the said medium by any suitable means, e.g., by precipitation, filtration, centrifuging, solvent extraction, etc. Any unreacted monomers and/or other impurities or contaminants are preferably removed from the copolymer by known means before monomer (c) is grafted thereto.

The average molecular weight of the copolymer of (a) and (b) can be varied widely, as desired or as conditions may require, but ordinarily is within the range of from about 1000 to about 3,000,000 or more as calculated from viscosity measurements using the Staudinger equation; or by determining the average molecular weight by other known methods and converting the value thereby obtained to a "Staudinger" average molecular weight.

Essentially the same general procedure and conditions of reaction are employed in grafting monomer (c), supra, to the copolymer of (a) and (b) as have been described hereinbefore with reference to the production of the aforesaid copolymer. If the copolymer is soluble in monomer (c), grafting of the latter to the former can be effected, if desired, by bulk or mass polymerization (with the aid of a polymerization catalyst) of a solution of the copolymer dissolved in the monomer. Alternatively, the copolymer can be dissolved or dispersed in a liquid medium, and monomer (c) grafted thereto while the copolymer is in dissolved or dispersed state. The graft polymer is then isolated from the reaction mass by any suitable means, e.g., by technique such as stated above with reference to the isolation of the copolymer of (a) and (b).

The graft polymers of this invention are particularly useful in the production of molding compositions and molded articles or as components thereof. Thus, articles molded from the graft polymers of the present invention have, in general, higher impact and flexural-strength characteristics than articles similarly molded from a conventionally prepared ternary polymer wherein the different monomer units are randomly distributed but have essentially the same chemical constitution as a graft polymer of the invention. Those graft polymers of the invention which contain a major proportion by weight of acrylonitrile, e.g., at least about 70% by weight thereof, are particularly valuable as a starting material for making oriented filaments, films, etc.

Other applications of these new graft polymers include their use in blends with homopolymers and other copolymers to impart better flow characteristics thereto during molding or otherwise forming shaped articles therefrom; and in plasticizing or otherwise modifying, to improve the useful properties thereof, a wide variety of other addition and condensation polymers, natural gums and resins, etc., including various polyvinyl resins, urea-formaldehyde resins, phenol-formaldehyde resins, melamine-formaldehyde resins, epon resins, alkyd resins, polyester resins, rosin, shellac, and others.

Dyes, pigments, plasticizers, lubricants, fillers, opacifiers and other effect agents can be incorporated with the graft polymers of this invention as desired or as conditions may require.

In order that those skilled in the art may better understand how the present invention can be carried into effect, the following examples are given by way of illustration and not by way of limitation. All parts and percentages are by weight unless otherwise stated.

EXAMPLE 1

A. *Copolymerization of butyl acrylate and diallyl dimethyl ammonium chloride*

To a five-liter reaction vessel equipped with a stirrer, thermometer, condenser, inert gas inlet and four dropping funnels is charged 2018 g. of demineralized water. Nitrogen is passed through while stirring for approximately one hour. Eighteen (18) g. of a surface-active agent, specifically a condensation product of about 10 moles of ethylene oxide with tert.-octyl phenol (a product which is commercially available under the name of Triton X–100), is charged to the vessel. Thirty (30) g. of ammonium persulfate, $(NH_4)_2S_2O_8$, is dissolved in 100 g. of demineralized water and placed in one dropping funnel. Twenty-seven and four-tenths (27.4) g. of sodium bisulfite in 100 g. of demineralized water is charged to a second dropping funnel. The ammonium persulfate (oxidizing agent) and sodium bisulfite (reducing agent) together constitute a "redox" (reduction-oxidation) catalyst system. In funnels Nos. 3 and 4 there are charged, respectively, 540 g. (598 ml.) of uninhibited butyl acrylate and 166.5 g. of a 36% solution of diallyl dimethyl ammonium chloride (DADM).

The contents of the reaction vessel are heated to 49° C. in a hot water bath and the reactants are charged in six equal portions. After the first addition of both monomers and both catalysts the reaction temperature is allowed to reach 60°±2° C., and every ten minutes thereafter the same amounts of monomers and catalysts are added. The total time of addition is 50 minutes. At the end of that time the batch is held at 60° C. for 1 hour. The vessel is then cooled, discharged, and the rubbery mass comprised of a thermoplastic copolymer of butyl acrylate and DADM is filtered off and repeatedly washed with water. The crude copolymer, after repeated precipitation in methanol from benzene solution, is found to contain 0.06% nitrogen. By calculation, it is found to contain 0.7% DADM.

B. *Addition of acrylonitrile to form graft polymer*

One hundred (100) grams of the thermoplastic butyl acrylate-DADM copolymer prepared as described under A are dissolved in 1950 g. benzene. The mass is heated on a water bath until reflux begins at 79° C. Three and three-fourths (3.75) g. benzoyl peroxide is dissolved in 50 g. benzene and charged slowly to the refluxing mass. The batch is then allowed to continue refluxing for ten minutes. At the end of that time 90 g. of acrylonitrile is added in a dropwise manner over a period of 45 minutes. The batch is held at reflux for four hours and fifteen minutes and then cooled and discharged. The product is a viscous, slightly straw-colored resin solution, with no insoluble suspension or precipitate. By analyzing the free acrylonitrile content, it is found that 40% of the original charge of acrylonitrile has reacted.

The resin (a graft polymer) is freed from unreacted monomers by repeated precipitation in methanol and dissolution in benzene. The purified resin is examined by infrared spectrum analysis and found to contain one nitrile group per three ester groups. It contains 9.1% nitrogen. By calculation, the polymer contains 34.5% acrylonitrile. The amount of grafted acrylonitrile corresponds very well with the amount of acrylonitrile used up during polymerization, as determined by free acrylonitrile titration.

While it is known that a random copolymer of 65/35 butyl acrylate-acrylonitrile is rubbery and soft, the graft polymer of this example is tough and quite stiff. The very fact that the product is soluble in benzene rules out the possibility of having a mixture of homopolymer of acrylonitrile and a copolymer of butyl acrylate and DADM. Polyacrylonitrile is insoluble in benzene.

A sample of the above-described graft polymer of acrylonitrile with the thermoplastic copolymer of butyl acrylate and DADM is molded to form a bar by molding for about 10 minutes at about 280° F. under a pressure of about 1200 pounds per square inch. The mold is cooled before removing the bar from the mold. A well-molded piece having a high-impact strength is obtained.

A series of graft polymers is prepared from other monomers in essentially the same manner described under Example 1. More detailed information on this series is given in Table I. In all cases a thermoplastic copolymer containing pendant double bonds is first formed and to which a third monomer is introduced. In Table I the preparation of the copolymer containing the pendant double bonds is designated as "First stage reaction," and the grafting of the third monomer on the resulting thermoplastic copolymer as "Second stage reaction." Also included in the table is the molar ratio of components in the final products as determined by nitrogen analysis and/or infrared spectrum analysis.

EXAMPLE 7

A thermoplastic copolymer of lauryl methacrylate and allyl acrylate in a weight ratio of starting monomers of 90:10 is prepared in the same way as described under Example 6. This copolymer is found to contain 17.4% allyl acrylate. The copolymer is mixed with styrene in three different ratios as follows:

|  | Grams |
|---|---|
| (a) Styrene | 194.0 |
| Copolymer | 6.0 |
| Benzoyl peroxide | 0.1 |
| (b) Styrene | 190.0 |
| Copolymer | 10.0 |
| Benzoyl peroxide | 0.1 |
| (c) Styrene | 180.0 |
| Copolymer | 20.0 |
| Benzoyl peroxide | 0.1 |

The bulk polymerization of the above three mixtures is carried out in the same manner as in Example 6. The Izod impact strengths of bars molded from the graft polymers of (a) and (b) are, respectively, 0.26 and 0.37 foot pound per inch; while the heat-distortion values are, respectively, 84° and 86° C.

EXAMPLE 8

A thermoplastic copolymer of butyl acrylate and allyl acrylate in a weight ratio of starting monomers of 97.5:2.5 is prepared in benzene solution at reflux temperature in the presence of a small amount of benzoyl peroxide as a polymerization catalyst. The resulting copolymer is a thick, viscous liquid. The residual monomers in the copolymers are removed first by methanol-washing and then by vacuum-drying at 50° C. On analysis by titration it is found that the thermoplastic copolymer contains

TABLE I

|  | Example 2 | Example 3 | Example 4 | Example 5 |
|---|---|---|---|---|
| First Stage Reaction: |  |  |  |  |
| Monomer A | Butyl acrylate | Butyl acrylate | Methyl methacrylate | Methyl methacrylate. |
| Monomer B | Diallyl phthalate | Allyl acrylate | Allyl acrylate | Allyl acrylate. |
| Percent B on A | 1 | 1 | 5 | 5. |
| Reaction carried out in | Benzene | Benzene | Benzene | Benzene. |
| Second Stage Reaction: |  |  |  |  |
| Monomer C | Acrylonitrile | Acrylonitrile | Acrylonitrile | Acrylonitrile. |
| Percent C on A | 66 | 66 | 66 | 66. |
| Reaction carried out in | Benzene | Benzene | Benzene | Benzene. |
| Percent Benzoyl peroxide on C | 0.085 | 0.162 | 0.162 | 0.01. |
| Product Molar Ratio: |  |  |  |  |
| Percent A | 38.6 | 51.5 | 61 | 83. |
| Percent B | 0.4 | 0.5 | 3 | 4. |
| Percent C | 61.0 | 48.0 | 36 | 13. |

EXAMPLE 6

Ninety (90) g. of methyl methacrylate, 10 g. of allyl acrylate, 200 g. of benzene and 1 g. of benzoyl peroxide are charged to a reaction vessel provided with a reflux condenser, and the mixture is heated therein under reflux at the boiling temperature of the mass for 4 hours. The resulting copolymer of methyl methacrylate and allyl acrylate is precipitated out by adding 1 liter of methanol. The thermoplastic copolymer is collected and washed with fresh methanol. The yield is 65 g. From analysis it is found that the copolymer contains 12.1% allyl acrylate.

Thirty (30) g. of the above copolymer is dissolved in 170 parts of styrene. To this solution is added 0.1 g. of benzoyl peroxide, and the mass is bulk polymerized using the following time and temperature conditions:

48 hours at 80° C.
24 hours at 100° C.
72 hours at 130° C.

The resulting graft polymer is granulated and molded into bars for physical measurements. The Izod impact strength is 0.28 foot pounds per inch; heat-distortion temperature, 94° C.

2.3% allyl acrylate. The above copolymer is mixed with styrene in three different ratios, as follows:

|  | Grams |
|---|---|
| (a) Styrene | 196.0 |
| Copolymer | 4.0 |
| Benzoyl peroxide | 0.1 |
| (b) Styrene | 192.0 |
| Copolymer | 8.0 |
| Benzoyl peroxide | 0.1 |
| (c) Styrene | 184.0 |
| Copolymer | 16.0 |
| Benzoyl peroxide | 0.1 |

The above mixtures are bulk polymerized in the same way as set forth in Example 6. The resulting graft polymers are granulated and molded into bars. Physical characteristics are as follows:

| Graft Polymer of— | Izod Impact Strength in Ft. Lbs./Inch | Heat-Distortion Temp., ° C. |
|---|---|---|
| a | 0.38 | 89 |
| b | 0.37 | 89 |
| c | 0.38 |  |

EXAMPLE 9

A high-molecular-weight thermoplastic copolymer of butyl acrylate and allyl acryllate is prepared by emulsion-polymerization technique as follows: 98 g. of butyl acrylate, 2 g. of allyl acrylate, 400 g. of water and 8 g. of a 25% solution of sodium dioctyl sulfosuccinate (emulsifying agent) is charged to a reaction vessel. Nitrogen is passed through the reaction mixture for 10 minutes to remove air. One (1) g. of ammonium persulfate (polymerization catalyst) is added and the mixture is heated to 70° C. A mild exotherm takes place and the batch is kept at 70° C. for 20 minutes. The resulting thermoplastic copolymer of butyl acrylate and allyl acrylate is separated from the emulsion by first freezing the emulsion and then thawing at room temperature. A fine, white solid copolymer separates out. The copolymer is collected and dried at 60° C.

Twenty (20) g. of the above copolymer is added to 380 g. of styrene. After complete dispersion has been obtained, 0.2 g. of benzoyl peroxide is added and the mixture is stirred in a reaction vessel provided with an anchor-type agitator for 8 hours at 100° C. The resulting viscous mass is then transferred to a bulk-polymerization tube. The tube is maintained at 100° C. for 72 hours and then for 72 hours at 130° C., yielding a solid (when cold) graft polymer of styrene with the thermoplastic copolymer of butyl acrylate and allyl acrylate. A portion of the graft polymer is granulated and molded into a bar. The Izod impact strength is 0.43 foot pound per inch; heat-distortion temperature, 50° C.

EXAMPLE 10

Sixteen (16) g. of the butyl acrylate-allyl acrylate copolymer produced as described under Example 9 is dissolved in 384 g. of styrene. When solution is complete, 0.2 g. of benzoyl peroxide is added. The mixture is polymerized with agitation in an atmosphere of nitrogen for 24 hours at 80° C. The conversion to graft polymer at the end of this time is found to be 48.7%. The viscous mass is then transferred to a bulk-polymerization tube and polymerized at 130° C. for 72 hours.

When cold, a portion of the solid graft polymer is granulated and molded into a bar. The Izod impact strength is 0.41 foot pound per inch; heat-distortion temperature, 92° C.

In contrast to the higher impact-strength values of the graft polymers of this invention wherein styrene is grafted to a backbone of a copolymer of the kind employed in practicing the present invention (see Examples 6–10), a bar molded of homopolymeric styrene has an Izod impact strength of only 0.21 foot pound per inch.

EXAMPLE 11

Example 11 is repeated with the exception that, instead of using 384 g. of styrene, there is employed 384 g. of a mixture of the three isomers of methylstyrene in the ratio of 30% by weight of ortho, 3% by weight of meta and 67% by weight of para. The impact strength and other physical properties of articles molded from the resulting graft polymer are essentially the same as those similarly molded from the graft polymer of Example 10 with the exception that the heat-distortion temperature of specimens made from the graft polymer of Example 11 averages at least about 2°–4° C. higher than that of specimens made from the graft polymer of Example 10.

Instead of the specific mixture of isomers of methylstyrene employed in the foregoing example, one advantageously can use a mixture of isomers of methylstyrene containing: from about 25% to about 40% ortho-methylstyrene; less than about 5% meta-methylstyrene; and from about 60% to about 75% para-methylstyrene. A particularly useful composition is one wherein the meta isomer is less than about 2% by weight, the ortho isomer is present in the polymer in a weight ratio of from about 28% to about 35%, while the para isomer is present in the polymer in a weight ratio of from about 65% to about 72%. Such a mixture of isomers of methylstyrene advantageously can be grafted to a reactive, thermoplastic copolymer of the kind used in practicing this invention and which has been more fully described in the portion of this specification prior to the examples.

It will be understood, of course, by those skilled in the art that this invention is not limited to the specific ingredients named in the above illustrative examples nor to the particular proportions and reaction conditions employed in preparing the copolymer and in grafting the third monomer thereto.

Additional examples of monomers (a) and (c), supra, that can be used in practicing the present invention are the vinyl, allyl and methallyl esters of saturated, aliphatic, monocarboxylic acids, e.g., formic, acetic, propionic, butyric, valeric, caproic and the higher members of the homologous series; the saturated monohydric alcohol esters, e.g., methyl to octadecyl, inclusive, of ethylenically unsaturated, aliphatic, monocarboxylic acids, e.g., acrylic and alpha-substituted acrylic (including alkacrylic, e.g., methacrylic, ethacrylic, etc., and arylacrylic, e.g., phenylacrylic, etc.); the various monovinyl cyclic compounds (including monovinyl aromatic hydrocarbons), e.g., o-, m- and p-chlorostyrenes, -bromostyrenes, -fluorostyrenes, -cyanostyrenes, the various polysubstituted styrenes such, for example, as the various di-, tri- and tetrachlorostyrenes, -bromostyrenes, -fluorostyrenes, -methylstyrenes, -ethylstyrenes, -cyanostyrenes, etc., monovinylnaphthalenes, monovinylcyclohexanes, etc.; acrylamide and alpha-substituted acrylamides (e.g., methacrylamide, ethacrylamide, etc.) and N-substituted acrylamides and alkacrylamides, e.g., N,N-dibutylacrylamide, N,N,-dipropylmethacrylamide, etc.; the various monovinyl and monoallyl ethers, e.g., ethyl vinyl ether, butyl vinyl ether, propyl allyl ether, etc.; the various monovinyl and monoallyl ketones, e.g., methyl vinyl ketone, methyl allyl ketone, etc.; vinyl and vinylidene halides, e.g., vinyl and vinylidene chlorides, bromides and fluorides; and others that will be apparent to those skilled in the art from the foregoing illustrative examples.

Additional examples of monomer (b), supra, that can be used in practicing the present invention are the ethylenically unsaturated monohydric alcohol esters of the ethylenically unsaturated, monocarboxylic acids, e.g., the vinyl, allyl, methallyl, crotyl, 1-chloroallyl, 2-chloroallyl, cinnamyl, 1-phenylallyl, butenyl, etc., esters of acrylic and alpha-substituted acrylic acids, numerous examples of which acids have been given hereinbefore; the various divinyl and diallyl hydrocarbons, e.g., divinyl benzene, diallyl benzene, etc.; and the various diallyl and dimethallyl esters of saturated aliphatic and aromatic polycarboxylic acids, e.g., oxalic, malonic, succinic, glutaric, adipic, pimelic, suberic, sebacic, phthalic, terephthalic, etc.; and others that will be apparent to those skilled in the art from the foregoing illustrative examples.

I claim:

1. A process of making a graft copolymer which comprises chemically combining, by copolymerization with the aid of a free-radical polymerization catalyst, (c) a nuclearly substituted methylstyrene and a reactive, thermoplastic copolymer, obtained by polymerizing with the aid of a free-radical polymerization catalyst, a polymerizable mixture of monomers consisting of (a) butyl acrylate and (b) allyl acrylate, the compound of (b) constituting from 0.5 mole percent to not more than 30 mole percent of the total molar amount of (a) and (b) in the aforesaid polymerizable mixture, the nuclearly substituted methylstyrene of (c) being polymerizably reactive with the aforesaid thermoplastic copolymer, and the molar proportions of the compound of (c) to the total of the compounds of (a) plus (b) being from about 50:99.5 of the compound of (c) to 0.5:50 of the total of the compounds of (a) plus (b).

2. A process as in claim 1 wherein the monovinyl-substituted cyclic compound of (c) is a mixture of isomers of methylstyrene containing, by weight, from about 25% to about 40% ortho-methylstyrene, less than about 5% meta-methylstyrene, and from about 60% to about 75% para-methylstyrene.

3. A graft copolymer which is the product of the process of claim 2.

References Cited in the file of this patent

UNITED STATES PATENTS

| | | |
|---|---|---|
| 2,202,846 | Garvey et al. | June 4, 1940 |
| 2,273,891 | Pollack et al. | Feb. 24, 1942 |
| 2,306,136 | Muskat | Dec. 22, 1942 |
| 2,335,133 | Renfrew | Nov. 23, 1943 |
| 2,431,374 | D'Alelio | Nov. 25, 1947 |
| 2,441,516 | Synder | May 11, 1948 |
| 2,482,825 | Amos et al. | Sept. 27, 1949 |
| 2,539,376 | Staudinger et al. | Jan. 23, 1951 |
| 2,569,954 | Ruebensaal | Oct. 2, 1951 |
| 2,597,202 | Tawney | May 20, 1952 |
| 2,626,252 | Tawney | Jan. 20, 1953 |
| 2,643,991 | Tawney | June 30, 1953 |
| 2,830,032 | Siebel | Apr. 8, 1958 |

UNITED STATES PATENT OFFICE
CERTIFICATION OF CORRECTION

November 1, 1960

Patent No. 2,958,673

Yun Jen

It is hereby certified that error appears in the above numbered patent requiring correction and that the said Letters Patent should read as corrected below.

Column 5, lines 32 and 34, for "stage re-", each occurrence, read -- Stage Re- --; column 6, line 35, for "copolymers" read -- copolymer --; column 7, line 4, for "acryllate" read -- acrylate --; line 55, for "Example 11" read -- Example 10 --; column 8, line 34, for "N,N,-dipropylmeth-" read -- N,N-dipropylmeth- --; column 8, line 74, for "0.5.50" read -- 0.5:50 --.

Signed and sealed this 2nd day of May 1961.

(SEAL)
Attest:

ERNEST W. SWIDER
Attesting Officer

DAVID L. LADD
Commissioner of Patents